United States Patent
Boss et al.

(10) Patent No.: US 7,127,978 B2
(45) Date of Patent: Oct. 31, 2006

(54) CIRCULAR SAW MACHINE

(75) Inventors: Stefan Boss, Bad Urach (DE); Klaus Frietsch, Rheinmünster (DE); Fritz Heydt, Nürtingen (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 0 days.

(21) Appl. No.: 10/820,394

(22) Filed: Apr. 8, 2004

(65) Prior Publication Data

US 2004/0244555 A1     Dec. 9, 2004

(30) Foreign Application Priority Data

Apr. 8, 2003   (EP) .................................. 03008133

(51) Int. Cl.
*B21B 5/00*    (2006.01)
*B23D 45/00*   (2006.01)

(52) U.S. Cl. .................... 83/821; 83/676; 83/827; 83/829

(58) Field of Classification Search ............ 83/821, 83/829, 827, 824, 168, 169, 828, 825, 823, 83/822, 820, 676, 523, 425.3, 425.4, 665, 83/659, 675; 181/322.11, 209, 207; 143/160; 51/267

See application file for complete search history.

(56) References Cited

U.S. PATENT DOCUMENTS

| | | | |
|---|---|---|---|
| 378,513 A | 2/1888 | Marshal | |
| 2,783,793 A * | 3/1957 | Jack et al. | 83/441.1 |
| 2,842,908 A | 7/1958 | Allison | |
| 3,661,045 A * | 5/1972 | Mermelstein | 83/676 |
| 3,703,915 A * | 11/1972 | Pearson | 83/824 |
| 3,772,956 A * | 11/1973 | McMillan | 83/827 |
| 3,828,635 A * | 8/1974 | Smith | 83/102.1 |
| 3,828,642 A * | 8/1974 | Orendi | 83/823 |
| 3,918,334 A * | 11/1975 | Wilcox | 83/13 |
| 3,961,548 A * | 6/1976 | Claassen | 83/169 |
| 4,136,590 A * | 1/1979 | Kordyban et al. | 83/169 |
| 4,323,145 A * | 4/1982 | Allen | 267/122 |
| 4,563,928 A * | 1/1986 | Salomonsson | 83/821 |
| 4,854,207 A * | 8/1989 | Kirbach et al. | 83/823 |
| 5,213,020 A * | 5/1993 | Pleau et al. | 83/828 |
| 5,497,684 A | 3/1996 | Martin | |
| 6,128,994 A * | 10/2000 | Phelps | 83/471.2 |
| 6,230,600 B1 * | 5/2001 | Stroud | 83/665 |
| 6,484,363 B1 * | 11/2002 | Chung | 16/242 |
| 2002/0073509 A1 * | 6/2002 | Dean | 16/387 |
| 2005/0072284 A1 * | 4/2005 | Auger | 83/478 |

\* cited by examiner

*Primary Examiner*—Boyer D. Ashley
*Assistant Examiner*—Ghassem Alie
(74) *Attorney, Agent, or Firm*—Volpe and Koenig, P.C.

(57) ABSTRACT

A circular saw machine having a saw blade (1) that is movably held for back and forth motion during the sawing process. A forward and a rearward saw blade guide (4, 5) ensure the stability of the saw blade (1) while sawing. The saw blade guides (4, 5) respectively have contact surfaces (6), which abut on the respective side surfaces of the saw blade (1). In order to operate the circular saw machine with different saw blade diameters, the forward saw blade guide (5) is removable from, or pivotable away from, the saw blade (1), and the saw blade itself is interchangeable. The radial positioning of the contact surfaces (6) of the saw blade guides (4, 5) is variable. This can be accomplished by interchanging the whole saw blade guide (5), but also in particular by a mounting (12), pivotable with respect to the saw blade guide (4, 5) and to which the contact surface (6) is fixed.

3 Claims, 9 Drawing Sheets

CIRCULAR SAW MACHINE

BACKGROUND

The invention relates to a circular saw machine with a saw blade which is retained, movable forward and backward in its rotation plane, for the sawing process; with a drive shaft for the saw blade, movable back and forth together with the saw blade; and with at least one rearward and one forward saw blade guide for the two side surfaces of the saw blade. The saw blade guides respectively have at least one contact surface to abut on the respective side surface of the saw blade.

Circular saw machines of this type are widely used in mass production of materials. Here steel rods are mostly sawn into individual sections, on which the highest accuracy requirements are placed in narrow tolerances relating to cut length, angularity, parallelism, and surface condition of the cut surfaces.

Thus the requirements on the accuracy of cut of the circular saw machine are particularly high in circular saw machines of the kind mentioned at the beginning. The already restricted tolerance regions on workpiece measurements are further restricted by quality assurance measures such as for example as regards the property "machinability" of the saw cuts.

Evidently, the saw blade is now the unstable component of a circular saw machine. Particularly with increasing wear of the saw blade, it tends to deflect obliquely during sawing. Furthermore, axial vibrations of the saw blade sometimes lead to inexact dimensions of the sawn blanks.

For this reason, it has already become customary for some time to guide the two side surfaces of the saw blade as close as possible to the teeth by means of a forward and a rear saw blade guide, in order to prevent oblique pulling and vibrational movements. This saw blade guidance has of course to be made stable and highly accurate, in order to attain the desired effect. Furthermore, in order to attain a certain wear resistance, respectively at least one contact surface, which is provided with hard metal deposits or with ceramic deposits, has to be provided for the corresponding side surfaces of the saw blade. The reduction of wear phenomena finally acts in its turn to increase the accuracy of the saw blade guidance and thus of the blank.

Now it is often desirable to saw different workpiece diameters. This is possible, though, only to a limited degree with one and the same saw blade. Thus for a clean cut, workpieces of different sizes as a rule need a different saw blade diameter with a different tooth division. However, because of the above-described requirements on the tolerances of the blanks, the saw blade guidance is up to now accurately designed for a given saw blade, so that numerous circular saw machines are needed if it is desired to saw workpieces of different diameter.

SUMMARY

Starting from the prior art, the invention has as its object to develop a circular saw machine of the kind mentioned at the beginning such that conversion of the same circular saw for different workpiece diameters becomes possible.

This object is attained by a circular saw machine with the features of the invention.

A circular saw machine according to the invention thus differs from the prior art in that the forward saw blade guide is removable from, or pivotable away from, the saw blade and also that the saw blade itself is interchangeably retained.

Here the radial distance between the contact surfaces of the saw blade guides and the drive shaft is respectively variable, and indeed is in particular adaptable to the different saw blade diameters.

The variability of the radial distance between the contact surfaces of the saw blade guides and the drive shaft makes possible a matching of the saw blade guides to different saw blade diameters; the fact that the forward saw blade guide can be removed or pivoted away makes it possible to interchange the forward saw blade guide with another having a different diameter.

The saw blades with different diameters as a rule also have different saw blade thicknesses. In accordance with a preferred embodiment of the invention, the distance between the rearward and the forward saw blade guides is adjustable.

There are now two different basic kinds of the development of the invention.

The forward saw blade guide can be formed as a plate, plural such plate-shaped saw blade guides being provided which are mutually interchangeable. Insofar as the plate-shaped saw blade guides are provided with different distances between the contact surfaces and the drive shafts, then quite simply the saw blade can be interchanged after removal of the forward saw blade guide and be provided again with a forward saw blade guide exactly matched to this saw blade.

It is of course advantageous if the rearward saw blade guide is also selectable from plural mutually interchangeable plates with different distances between the contact surfaces and the drive shaft. If instead of this it is not desired to remove and interchange the whole rearward saw blade guide, it is advantageous if the contact surfaces at the rearward saw blade guide are adjustable in their spacing from the drive shaft. This can take place quite simply, for example, in that the contact surfaces with their mountings are seated in corresponding recesses of the rearward saw blade guide and on interchanging saw blades are removed from these recesses and are inserted in other recesses, matched to the new saw blade.

The second basically given possibility of further developing the present invention as regards operating reliability has been found to be particularly advantageous if the contact surface is installed on a mounting, pivotable parallel to the saw blade plane, on the saw blade guide, with the mounting being preferably fixable at predetermined pivot angles. An erroneous operation can be detected very easily in the latter case.

According to this second possibility of embodying the invention, it is not necessary to remove a correspondingly heavy plate-shaped forward saw blade guide in order to interchange it with another. Rather, the saw blade guide is here substantially left as it is; only the contact surfaces are adjusted in order to obtain a matching of the entire saw blade guide to different saw blade diameters.

In order to facilitate changing saw blades and to provide clear advantages over interchangeable saw blade guide plates, the forward saw blade guide can be arranged to be pivotable away from the saw blade by means of a hinge, the pivot axis of the hinge being adjustable by means of an eccentric mounting in order to set the distance between the rearward and the forward saw blade guides to adapt to different thicknesses of the saw blade.

Since it is not optimum to retain the forward saw blade guide at only one hinge, a further fixing point for the forward saw blade guide, spaced apart from the hinge, is preferably provided. This is the more important in that strict parallelism of the forward and rearward saw blade guides is necessary in order to be able to maintain the predetermined close tolerances. For this, it has been found to be appropriate to connect together the forward and the rearward saw blade guides at a point near the saw blade, spaced apart from the hinge, by means of a spacer piece. The spacer piece can be provided here as interchangeable or adjustable.

The spacer piece can furthermore be provided, for reliability of operation, such that it brings about a predetermined wider or correspondingly narrower distance between the forward and rearward saw blade guides.

BRIEF DESCRIPTION OF THE DRAWINGS

Two exemplary embodiments of the invention are explained and described in more detail hereinafter, with reference to the accompanying drawings.

DEATILED DESCRIPTION OF THE PREFERRED EMBODIMENTS

Figure 1A:
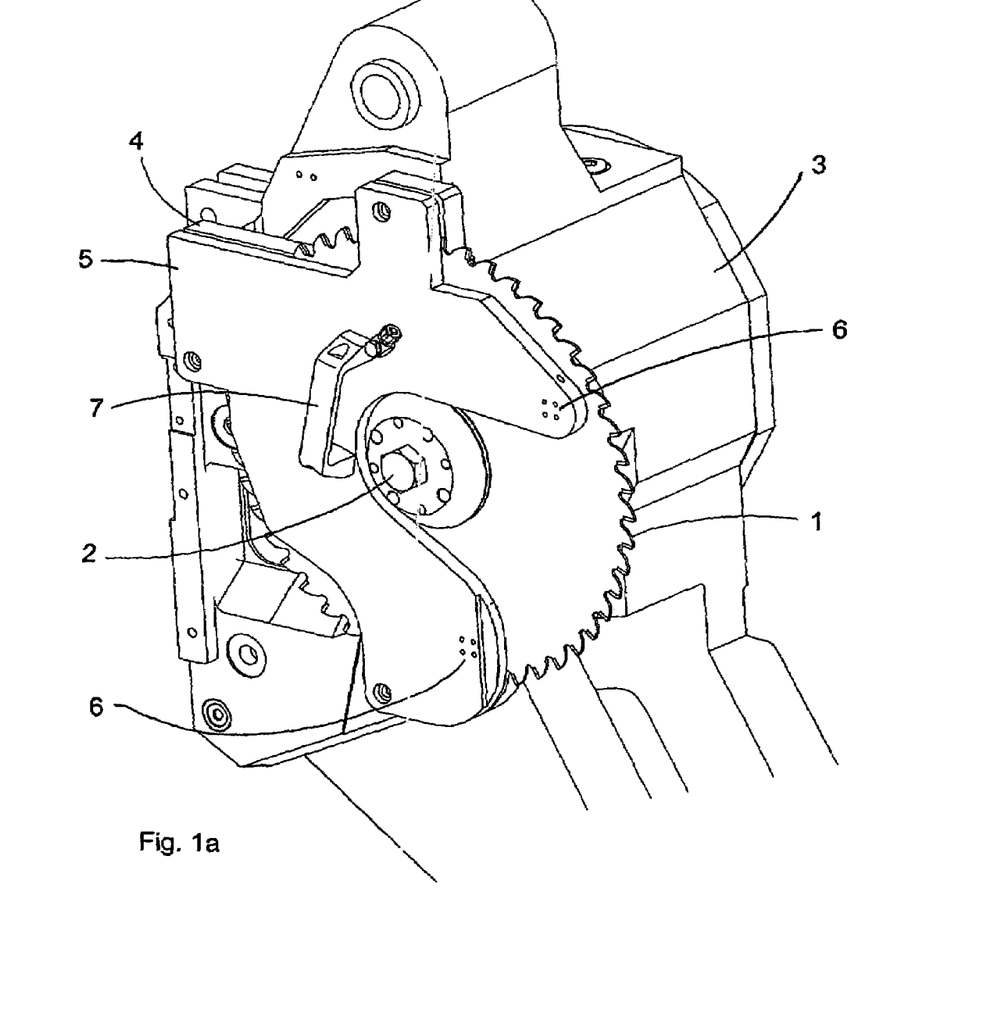
FIG. 1a is a schematic diagram of the portions of interest of a circular saw machine according to the invention, according to a first exemplary embodiment.

The portion shown in FIG. 1a of a circular saw machine according to the invention substantially includes a saw blade 1, seated on a drive shaft 2 on a drive housing 3. A rearward 4 and a forward saw blade guide 5 support two respective contact surfaces 6 which slidingly abut an the side surfaces of the saw blade 1 and ensure an accurate guiding thereof during sawing. The entire functional block shown here of the circular saw machine can be moved back and forth in a pivoting movement in a rotation plane of the saw blade for the sawing process.

Figure 1B:
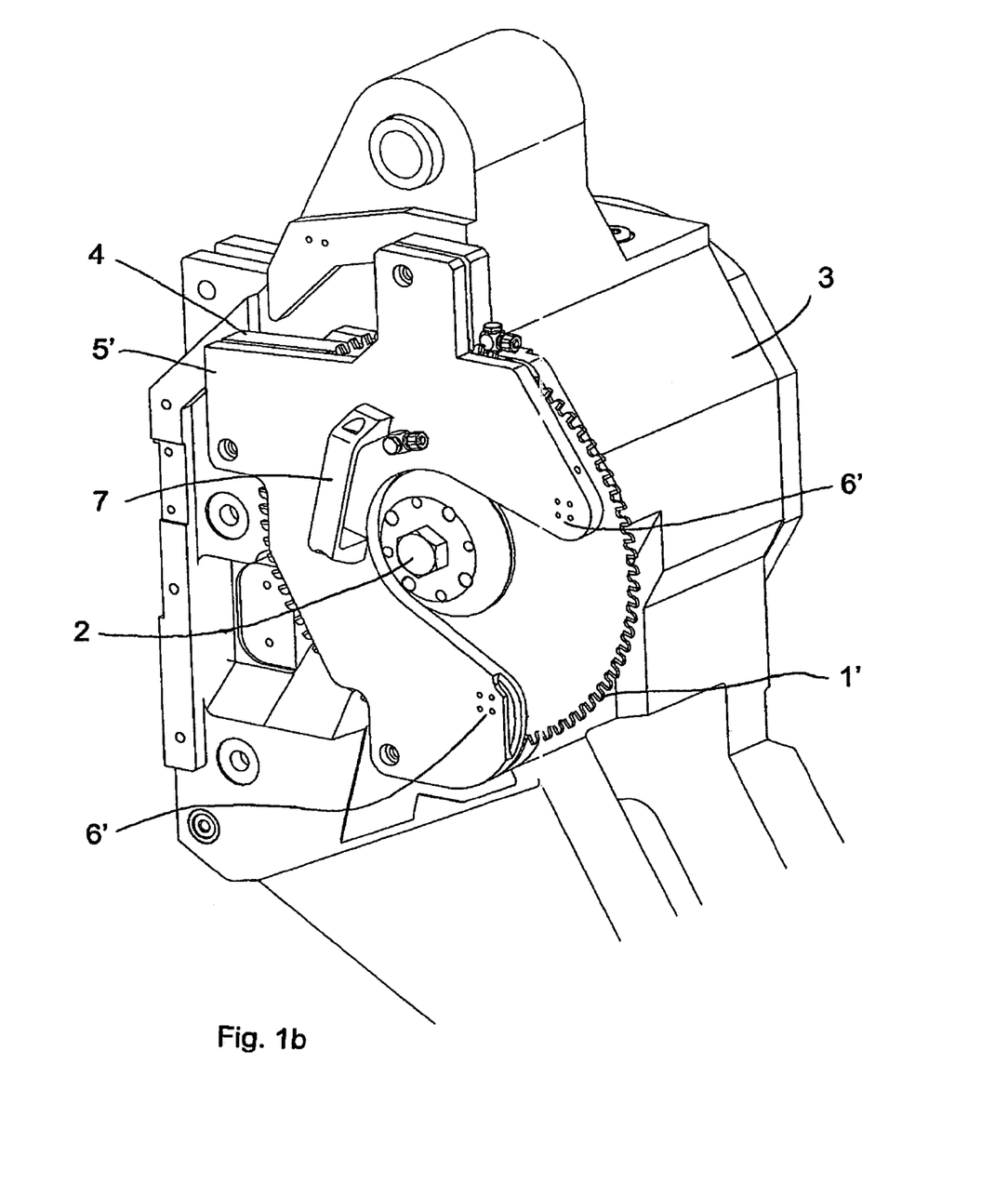
FIG. 1b is a view similar to FIG. 1a showing a circular saw machine with replacement guides for a smaller diameter blade.
Figure 2A:
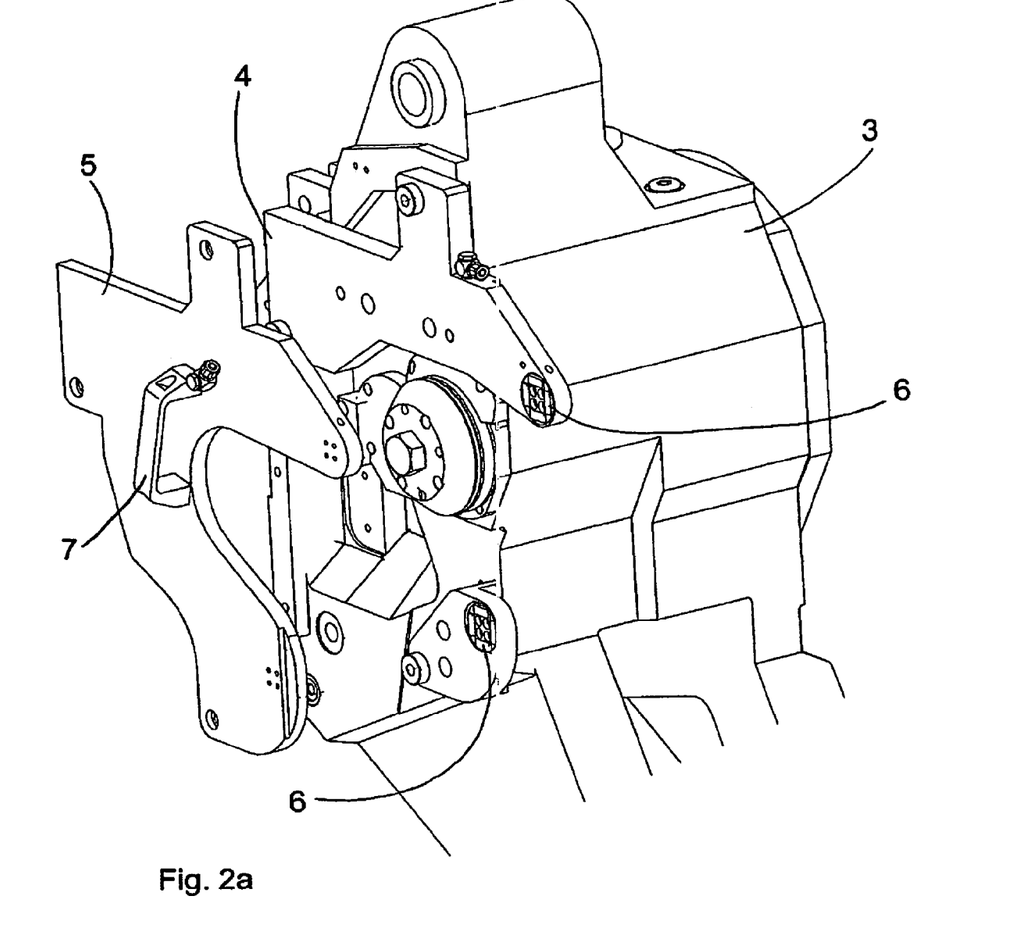
FIG. 2a is a diagram similar to FIG. 1a, showing changing of the saw blade.
Figure 2B:
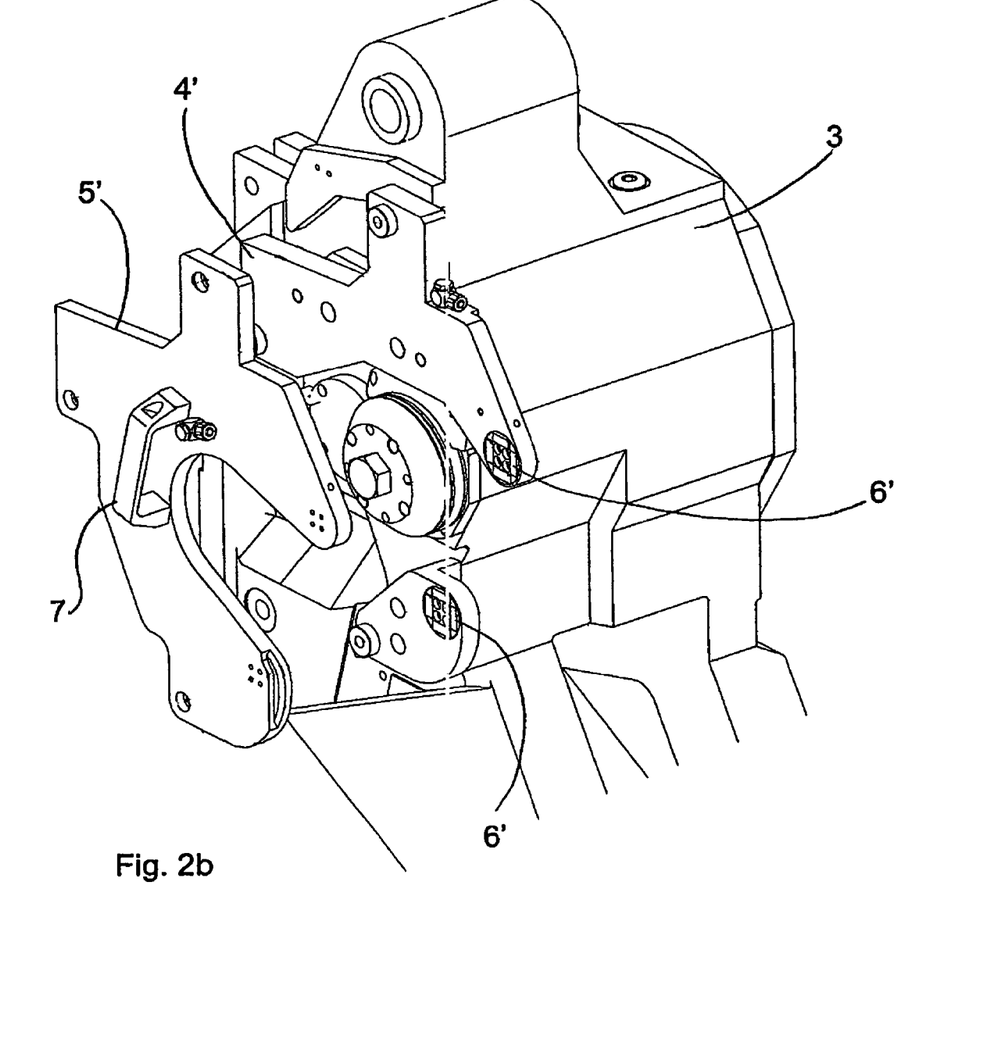
FIG. 2b is a diagram similar to FIG. 1b showing the replacement guides being installed.

The saw blade guides 4, 5 used in this first embodiment are, as clearly shown in FIG. 2a, plate-shaped and interchangeable. In particular, the forward saw blade guide is comprised of an interchangeable plate; a handle 7 facilitates interchanging. The rearward saw blade guide 4 comprises, strictly speaking, two plate portions, each of which supports a contact surface 6. The contact surfaces 6 include, as clearly seen here, four hard metal plates arranged flat for abutment on the saw blade, 1, here removed. Only the larger plate portion is interchanged in the case of the rearward saw blade guide 5; the smaller plate portion is simply turned around at the fastenings provided there, so that the corresponding contact surface 6 comes to lie further inward or further outward, in order to undertake the required adaptation to the different saw blade diameter. Interchangeable saw blade guides 4', 5' for a smaller diameter blade 1' are shown in FIGS. 1b and 2b. The contact surfaces are indicated at 6' for the smaller diameter blade 1'.

Figure 3:
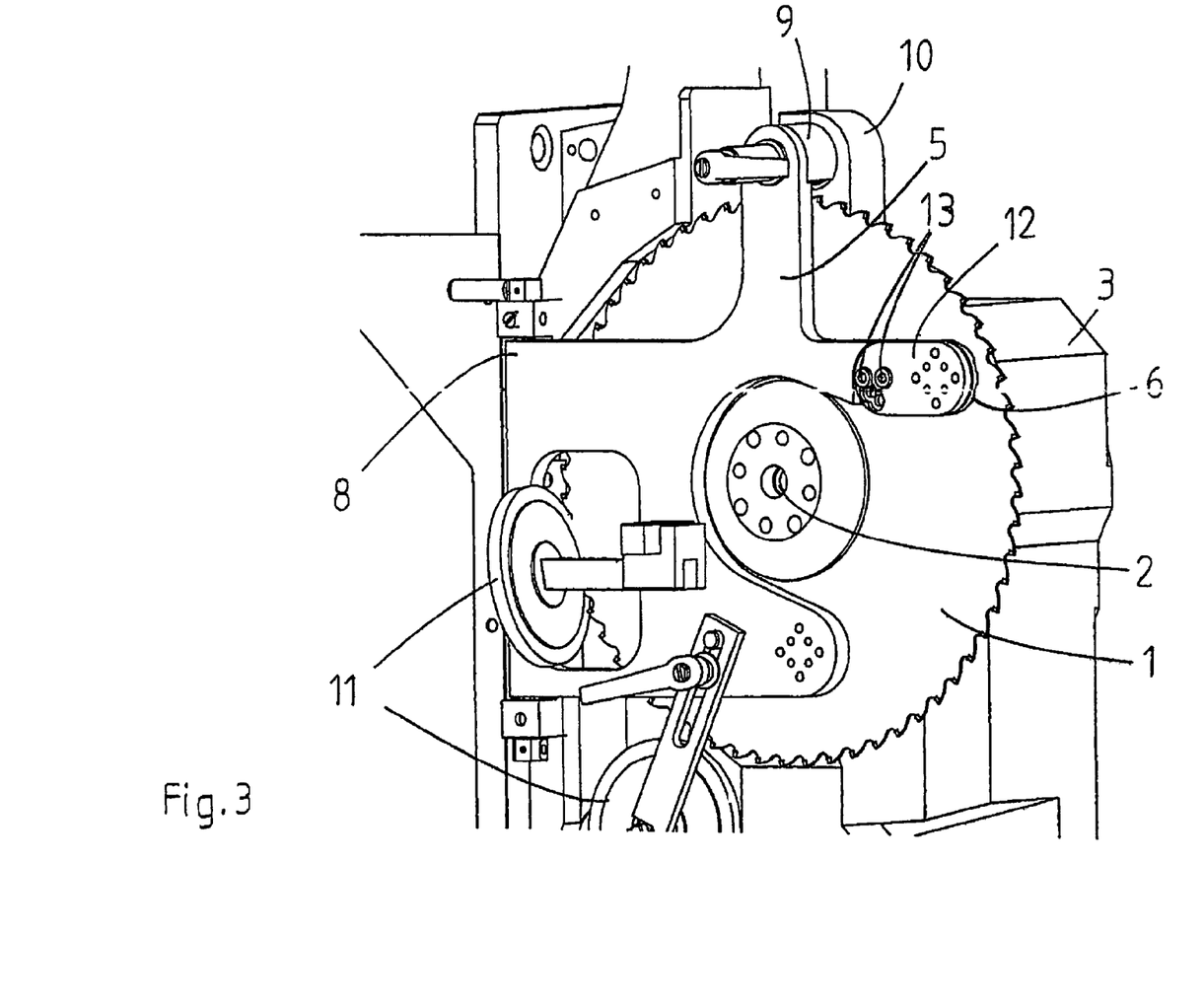
FIG. 3 is a schematic diagram similar to FIG. 1, of another exemplary embodiment of the invention.
Figure 5:
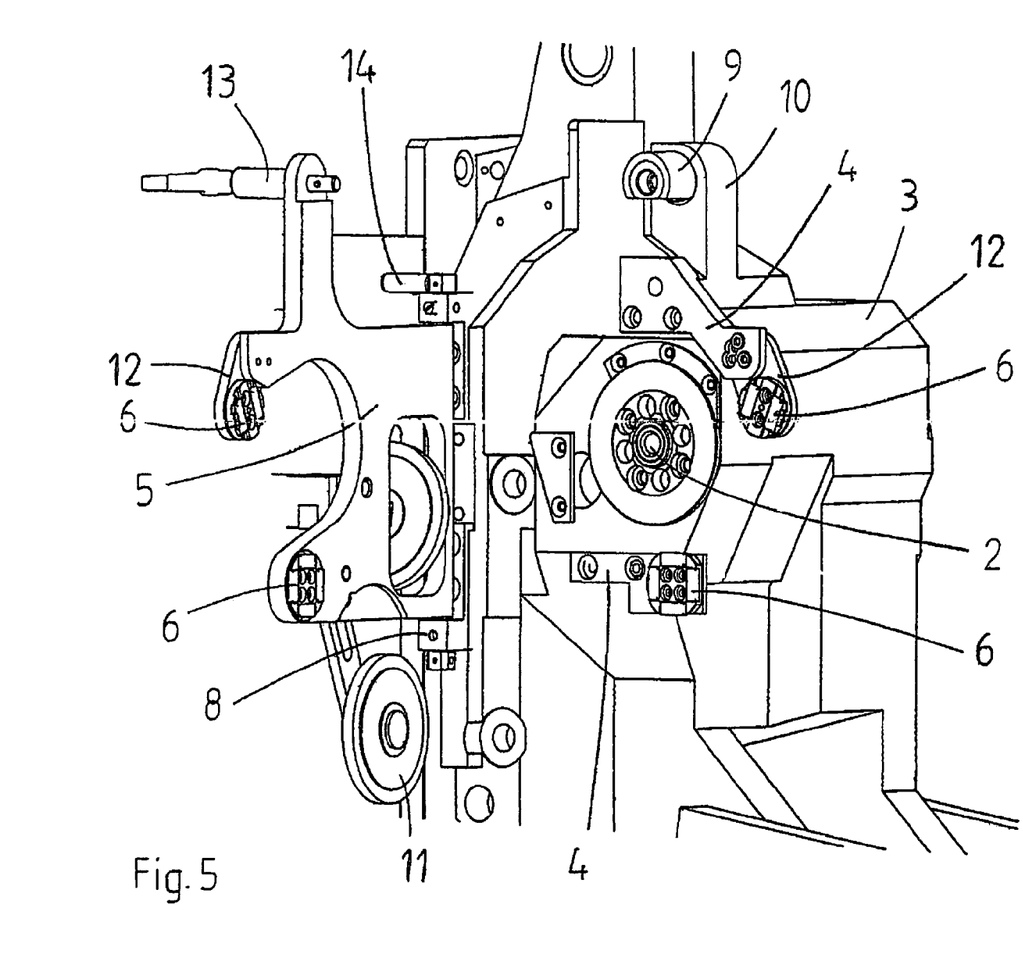
FIG. 5 shows the circular saw machine of FIGS. 3 and 4, when changing the saw blade.

FIG. 3 shows a second embodiment of a circular saw machine according to the invention. Here again a saw blade 1 is connected by a drive shaft 2 to a drive housing 3, which can be moved back and forth together with the saw blade 1, in order to execute a saw blade movement. A forward saw blade guide 5 is constructed markedly lighter than the forward saw blade guide of the first embodiment. It is also not interchangeable, but is pivotable around a hinge 8 for an exchange of the saw blade 1, as shown in FIG. 5. Spaced apart from the hinge 8, the forward saw blade guide 5 is fixed to a retaining device 10 on the drive housing 3 via a spacer 9. High stability of the forward saw blade guide 5 and also the required parallelism between the forward 5 and rearward 4 blade guides are hereby ensured. To remove the chips arising during sawing from the teeth of the saw blade, two further chip removal brushes 11 are provided at the forward saw blade guide 5, but are not important for the invention.

Figure 4:
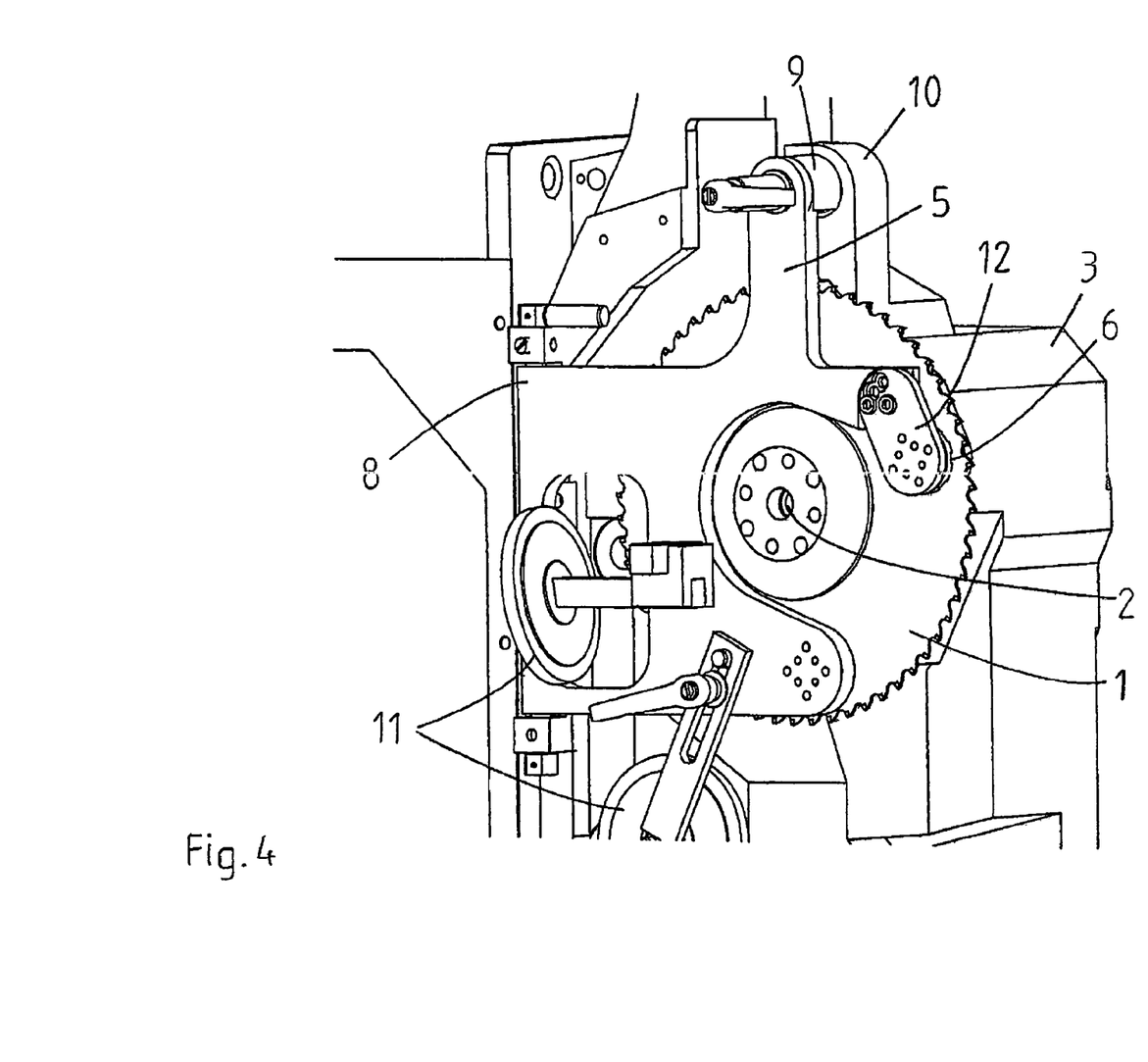
FIG. 4 is a diagram similar to FIG. 3, but with a smaller saw blade.

It is most clearly seen, by comparison of FIGS. 3 and 4, how the contact surfaces 6 of the forward saw blade guide 5 can be adapted to different diameters of the different saw blades 1 that are inserted. The upper contact surface 6 is seated for this purpose on a mounting 12, which is releasably or at least pivotably fixed to the forward saw blade guide 5. Here three pivot positions are provided, and are predetermined by three bores.

By releasing the fixing screws 19 and removing the rearward of the two screws, the mounting 12 can be pivoted, and thereafter fixed again by tightening the fixing screws 19. The pivoting has the effect, as clearly seen from FIGS. 3 and 4, that the radial distance between the corresponding contact surface 6 and the drive shaft 2 is changed. With a large saw blade 1 (FIG. 3), the contact surface 6 is seated radially further outward than in the pivoted state with small saw blades 1 (FIG. 4).

FIG. 5 shows the second embodiment with folded-out forward saw blade guide 5 and without saw blade 1. Hereby the rearward saw blade guide 4 is visible, which likewise has a sliding surface 6, and which is formed pivotably with a mounting 12 and can thus be set in its radial position on the saw blade 1. Here also three pivot angles are again provided, since saw blades are usually produced in standard sizes and thus provision of pivot angles matching these standard sizes is advantageous. The contact surfaces 6 located respectively below the rearward 4 and forward saw blade guide 5 are not adjustable in the embodiment shown, since a sawing machine is concerned here whose saw blade is moved in a back and forth pivoting movement for sawing, and thus a lower contact surface 6 extending too far outward would be troublesome.

Figure 6:
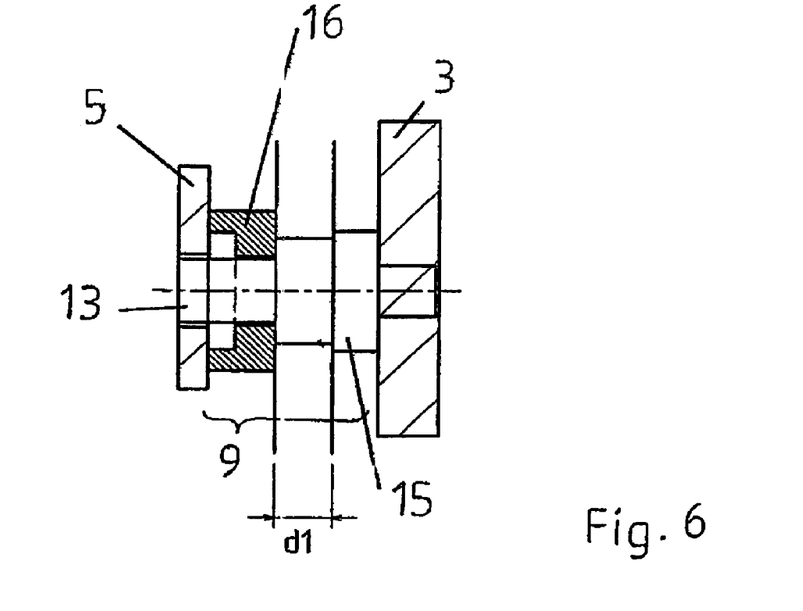
FIG. 6 is a schematic detail diagram to show the manner of functioning of the spacer piece in the embodiment of FIGS. 3–5.
Figure 7:
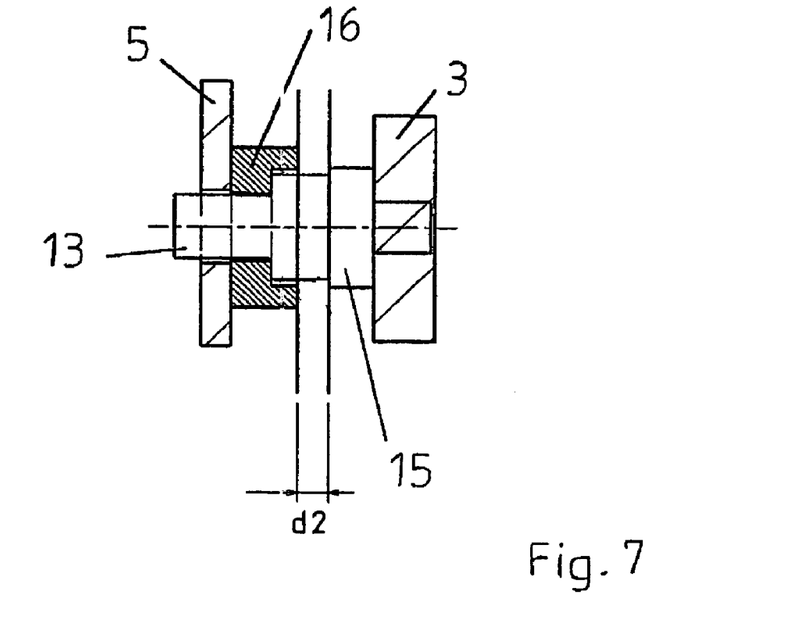
FIG. 7 is a diagram corresponding to FIG. 6.

The releasable connection of the forward saw blade guide 5 to the mounting 10 via the spacer 9 by means of a fixing bolt 13 is shown more accurately in FIGS. 6 and 7. Since saw blades with smaller radii are generally also thinner than saw blades with greater radii, a matching of the distance between the rearward 4 and forward saw blade guide 5 is furthermore provided for matching different saw blade thicknesses. Instead of the fixing bolt 13, for this purpose a specially formed spacer piece 9 is provided, which makes possible the adjustment of the distance between the rearward and forward saw blade guides 4, 5 in two stages.

FIG. 6 shows the arrangement with thicker saw blades. The spacer 9 includes a spacer bolt 15 and a spacer bushing 16; the spacer bushing 16 can be removed and replaced again in another configuration. The fixing bolt 13 passes through the forward saw blade guide 5, the spacer bushing 16 and the spacer bolt 16, and is fixed in the drive housing 3. When the spacer bushing is built-in in the orientation shown in FIG. 6, its whole thickness contributes to the distance between the drive housing 3 and the forward saw blade guide 5 for a greater thickness d1 of the saw blade 1. As long as the spacer bushing 16 however, as shown in FIG. 7, is built-in in the reversed orientation, the spacer bolt 16 is seated in a recess in the spacer bushing, so that the distance between the forward saw blade guide 5 and the gear housing 3 is reduced, giving a reduced thickness d2 of the saw blade 1.

In order to perform matching of the distance between the forward and rearward saw blade guides 4, 5 to different saw blade thicknesses, it is however not sufficient to just provide a longer or shorter spacer 9. Rather, an adjustment of the distance also has to be provided at the hinge 8.

Figure 8:
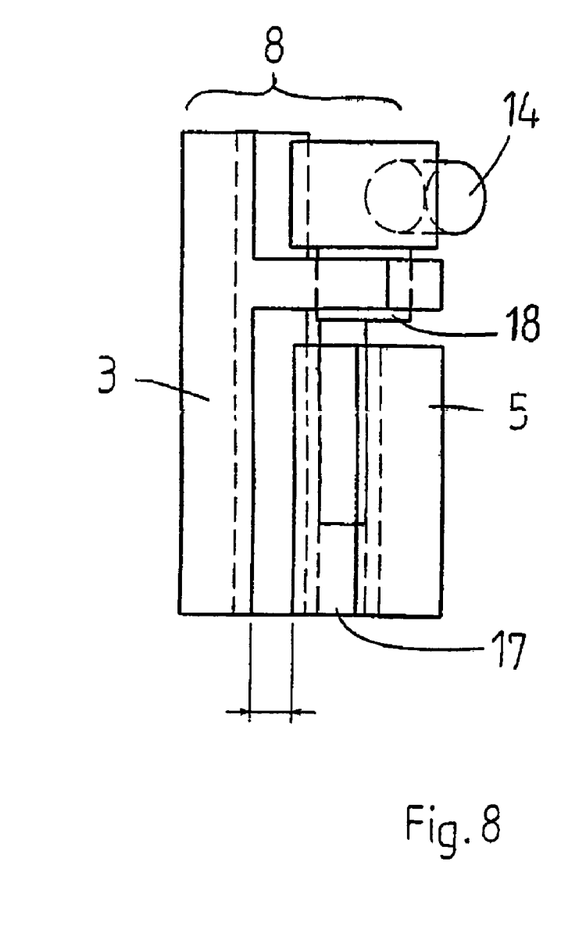
FIG. 8 is a schematic diagram of the eccentric hinge in the circular saw machine described in FIGS. 3–5.
Figure 9:
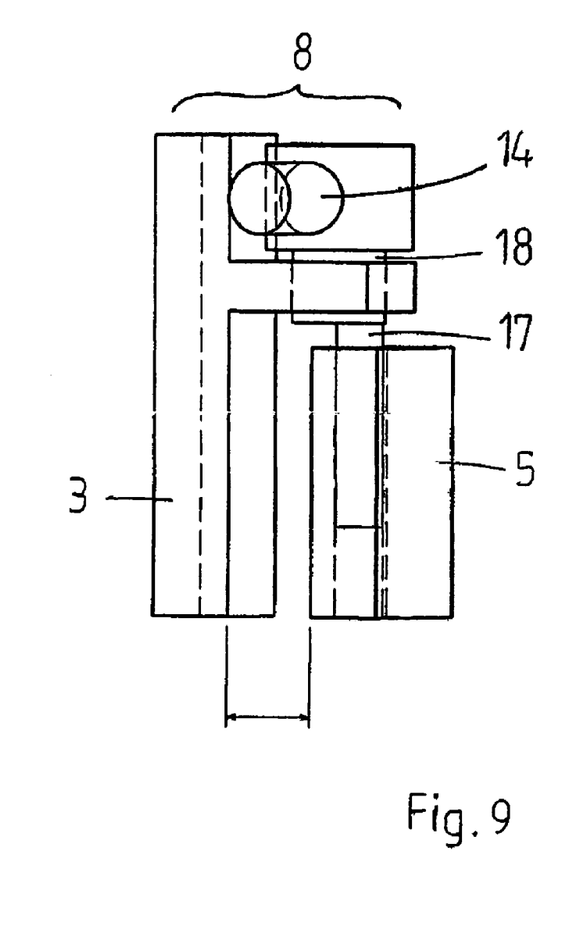
FIG. 9 is a diagram corresponding to FIG. 8.

How this has been carried through in this case is shown in detail in FIGS. 8 and 9. These Figures show the hinge 8, whose hinge bolt 17 is fixed to the drive housing 3 by means of an eccentric 18. The eccentric 18 is actuated via an eccentric lever 14, which can be seen in FIGS. 3–6. For this purpose, the eccentric lever 14 pivots from a first into a second position, in order to bring the hinge bolt 17 closer to the gear housing 3 (FIG. 8) to match a first, small saw blade thickness, or to space it apart more from the gear housing 3 (FIG. 9). Here again, it is already predetermined by the two positions of the eccentric lever 14 to what extent the eccentric 18 displaces the hinge bolt 17 in order to be able to ensure exact parallelism of the two saw blade guides 4, 5, even with inexact operation of the machine.

LIST OF REFERENCE NUMERALS 1. saw blade
2. drive shaft
3. drive housing
4. saw blade guide (rearward)
5. saw blade guide (forward)
6. contact surfaces
7. handle
8. hinge
9. spacer
10. retaining device
11. chip space brushes
12. mounting (for 6)
13. fixing bolt
14. eccentric lever
15. spacer bolt
16. spacer bushing
17. hinge bolt
18. eccentric
19. fixing screw

The invention claimed is:

1. Circular saw machine comprising a saw blade (1) and a drive shaft (2) to which the saw blade is removably and interchangeably mounted, and at least one rearward saw blade guide (4) and at least one forward saw blade guide (5) that contact two side surfaces of the saw blade (1), the saw blade guides (4, 5) respectively have at least one contact surface (6) to be abutted on the respective side surface of the saw blade (1), and for sawing, the drive shaft (2), with the saw blade thereon, is rotated in a drive housing arranged for back and forth movement in a rotation plane of the blade, the forward saw blade guide (5) is connected to the drive housing so that the forward saw blade guide is pivotable away from the saw blade (1); a radial distance between the contact surfaces (6) of the saw blade guides (4, 5) and the drive shaft (2) is respectively adjustable in predetermined defined positions for matching different diameter saw blades, at least one of the saw blade guides (4, 5) is installed on a mounting (12) that is pivotable in a direction parallel to the plane of the saw blade on the saw blade guide (4, 5), with the mounting (12) being fixable at a plurality of predetermined pivot angles, the forward saw blade guide (5) is pivotable away from the saw blade (1) by a hinge (8), a hinge pin located along a pivot axis of the hinge (8) being adjustable by an eccentric mounting in order to set a distance between the rearward and the forward saw blade guides (4, 5) for matching different thicknesses of the saw blade (1).

2. Circular saw machine according to claim 1, wherein the forward saw blade guide (5) at a point spaced apart from the hinge (8) near the saw blade (1) is connected by a spacer (9) to the rearward saw blade guide (4) or a retaining device (10) rigidly fixed relative thereto, the spacer (9) being at least one of interchangeable and adjustable.

3. Circular saw machine according to claim 2, wherein the spacer (9) is formed such that, depending upon an orientation with which the spacer is assembled, a predetermined wider or narrower distance between the forward and the rearward saw blade guides (4, 5) is provided.

* * * * *